(12) United States Patent
Wilcox

(10) Patent No.: US 7,629,919 B2
(45) Date of Patent: Dec. 8, 2009

(54) METHOD AND APPARATUS FOR MEASURING DISTANCE USING DUAL-COMPONENT RADAR

(75) Inventor: Martin S. Wilcox, Redhill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/537,856

(22) PCT Filed: Nov. 21, 2003

(86) PCT No.: PCT/IB03/05343

§ 371 (c)(1),
(2), (4) Date: Jun. 7, 2005

(87) PCT Pub. No.: WO2004/053522

PCT Pub. Date: Jun. 29, 2004

(65) Prior Publication Data

US 2006/0044181 A1    Mar. 2, 2006

(30) Foreign Application Priority Data

Dec. 11, 2002 (GB) .............................. 0228808.2

(51) Int. Cl.
*G01S 11/02* (2006.01)
(52) U.S. Cl. .................... 342/118; 342/135; 342/125
(58) Field of Classification Search .......... 342/118–146
See application file for complete search history.

(56) References Cited

U.S. PATENT DOCUMENTS

| | | | | |
|---|---|---|---|---|
| 3,530,467 A | * | 9/1970 | Attwood et al. ............. | 342/102 |
| 3,659,292 A | * | 4/1972 | Low et al. .................... | 342/98 |
| 3,765,017 A | * | 10/1973 | Dentino ....................... | 342/162 |
| 4,057,800 A | * | 11/1977 | Ganz ............................ | 342/116 |
| 4,430,655 A | * | 2/1984 | Rittenbach ................... | 342/155 |
| 4,537,502 A | * | 8/1985 | Miller et al. ................. | 356/5.11 |
| 4,847,622 A | * | 7/1989 | Maitre et al. ................. | 342/110 |
| 5,661,460 A | * | 8/1997 | Sallen et al. ................. | 340/573.4 |

(Continued)

FOREIGN PATENT DOCUMENTS

EP    1055940 A1    11/2000

(Continued)

OTHER PUBLICATIONS

Werb, J et al, "Designing a Positioning System for Finding Things and People Indoors", IEEE Spectrum, vol. 35, No. 9, Sep. 1998, pp. 71-78.

(Continued)

*Primary Examiner*—Thomas G Black
*Assistant Examiner*—Shelley Chen

(57) ABSTRACT

A device measures distance using a wireless signal that has two simultaneously transmitted components. Each of the two components includes a respective repeated code, the two codes having different durations. On receipt of the signal, the propagation distance is calculated separately for each code and compared. The calculated distance is considered to be valid only if the two calculations yield the same result. Preferably, the durations of the two codes are proportional to numbers having a relative prime relationship. The signal is generated and transmitted by the same device that performs the distance calculation, with the signal being retransmitted back to the device by a remote device, or may be generated and transmitted by the remote device.

14 Claims, 3 Drawing Sheets

U.S. PATENT DOCUMENTS

Figure 3:
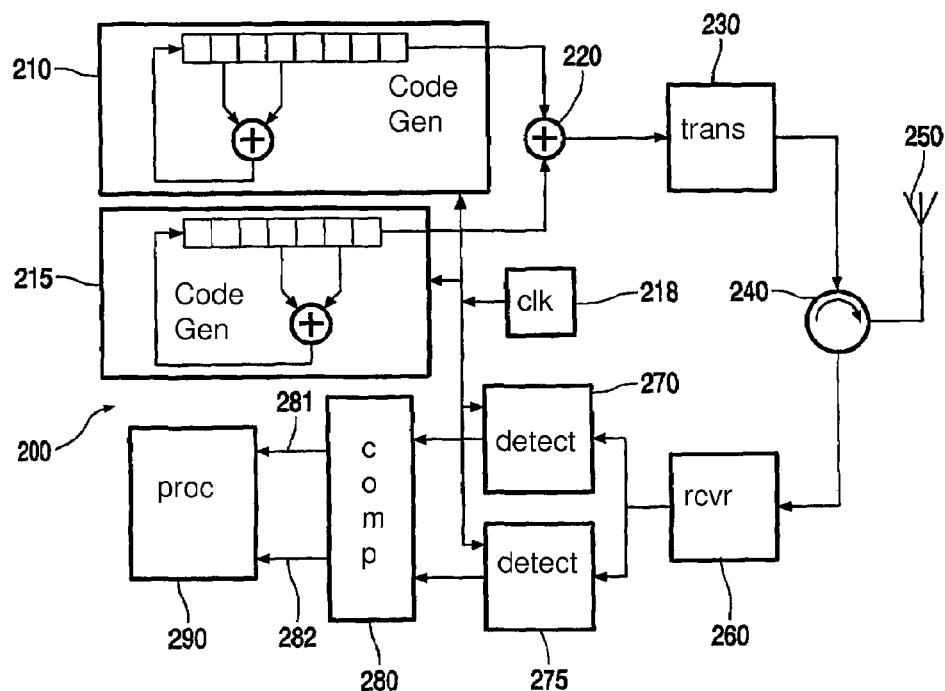

| | | | |
|---|---|---|---|
| 5,796,364 A * | 8/1998 | Fuchter et al. | 342/99 |
| 5,808,580 A * | 9/1998 | Andrews, Jr. | 342/162 |
| 6,295,019 B1 * | 9/2001 | Richards et al. | 342/125 |
| 6,420,992 B1 | 7/2002 | Richmond | |
| 6,614,387 B1 * | 9/2003 | Deadman | 342/70 |
| 7,023,356 B2 * | 4/2006 | Burkhardt et al. | 340/825.49 |
| 2002/0063622 A1 | 5/2002 | Armstrong et al. | |
| 2002/0130807 A1 | 9/2002 | Hall et al. | |
| 2006/0044181 A1 * | 3/2006 | Wilcox | 342/118 |
| 2006/0049975 A1 * | 3/2006 | Knepper et al. | 342/118 |
| 2006/0071854 A1 * | 4/2006 | Wilcox | 342/458 |

FOREIGN PATENT DOCUMENTS

| | | |
|---|---|---|
| WO | 2004/053522 A1 | 6/2004 |

OTHER PUBLICATIONS

Ansaf Ibrahem Alrabady et al, "Some Attacks Against Vehicles' Passive Entry Security Systems and Their Solutions" IEEE Transactions on Vehicular Technology, vol. 52, No. 2, Mar. 2003, pp. 431-439.

* cited by examiner

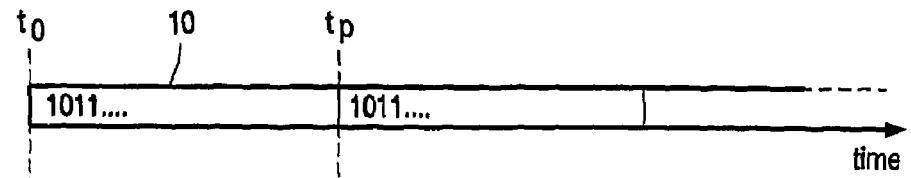
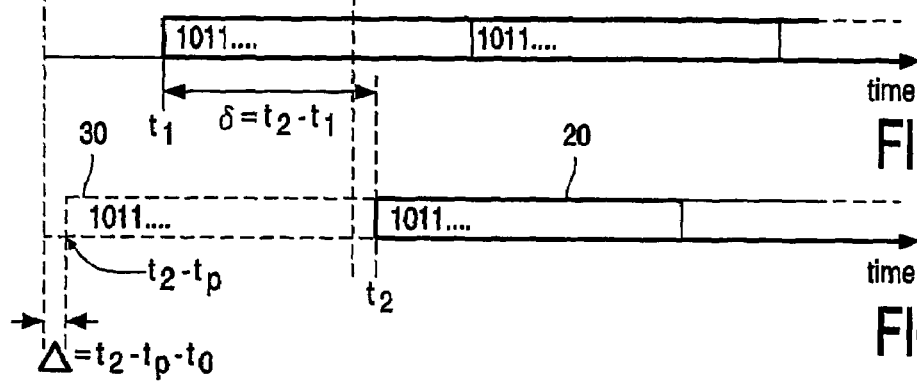
FIG. 1a
FIG. 1b
FIG. 1c
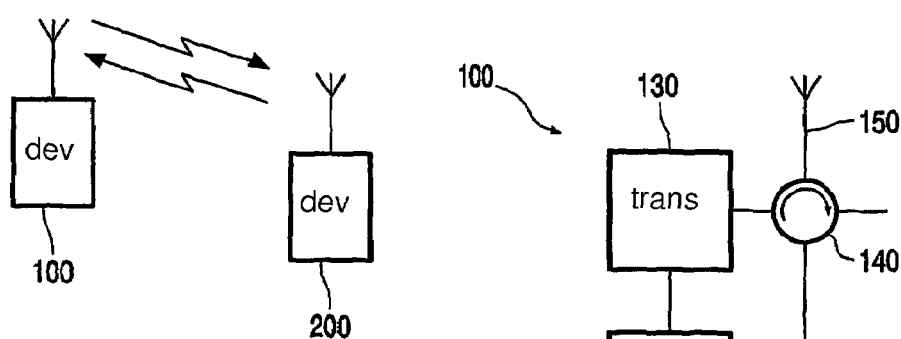
FIG. 2
FIG. 4

METHOD AND APPARATUS FOR MEASURING DISTANCE USING DUAL-COMPONENT RADAR

The invention relates to a method and apparatus for use in the measurement of distance.

Wireless devices which measure their proximity to another device, or their absolute position, are becoming more widespread. They are increasingly being used in applications where security is an issue. One example is a child locator device which enables a parent to keep track of the whereabouts of their child. A second example is a passive keyless entry system for vehicles, in which the proximity of the owner with a key fob in his pocket is sufficient to trigger the vehicle to unlock its doors. A third example is a wireless tag that can be attached to an object to monitor its whereabouts and to detect unauthorised movement. In these examples, the system must be robust against attack, in the case of the first example, from a child abductor, or indeed an ingenious child who doesn't wish to be tracked, and in the case of the other examples, a thief.

One technology that can be used for proximity detection over a local area is described in "Designing a positioning system for finding things and people indoors", J. Werb and C. Lanzl, IEEE Spectrum, September 1998. In this article Werb at al describe a system in which a signal is sent from a master unit to a tag being carried on the person being tracked. The tag receives the signal and simply re-transmits the signal on a different frequency without processing it. The master unit measures the time-of-arrival of the returning signal, compares it with the time at which it transmitted the signal to the tag and calculates the range to the tag.

Such a known technology is open to attack by a third party or by one of the parties involved in the proximity measurement who wishes to lie about their whereabouts. The attack can comprise inserting an additional delay so that an artificially long time-of-arrival is measured and consequently the tag appears to be further away from the master unit than it actually is. Adding such a delay might be a relatively simple procedure: for example, in a system with a screw-in antenna, an extra delay element such as an off-the-shelf microwave filter could be screwed in between the antenna and the device. The tag itself will introduce some delay, since it cannot instantaneously re-transmit the signal. This inherent delay can be calibrated out at the factory during manufacture.

Other known technologies use a signal generated and transmitted from the tag, rather than using the tag as a transponder, although the transmission from the tag may be initiated by receipt of a signal sent from the master unit. Such systems are also vulnerable to attack by insertion of additional delay.

An attack may also result in the tag appearing to be closer to the master unit than it actually is. This is because, in order to permit a simple detection circuit, the signal used for making the range measurement typically comprises a repeated code sequence. As a result there is an ambiguity in the time-of-arrival equal to multiples of the duration of the code, and consequently an ambiguity in the measured range. So, for example, a code sequence having a duration of 10 µs results in an ambiguity in the time-of-arrival equal to n×10 µs, where n is any integer including zero. Consequently there is an ambiguity in the measured range of n×3 km, so the master unit cannot differentiate between a tag at, say, 10 m and 3010 m. Therefore a tag at a distance of 3010 m may appear to be 10 m from the master unit. Of course a signal received over a distance of 3010 km would be attenuated compared with a signal received over 10 m, but an attacker may readily compensate for this attenuation by boosting the signal level.

The attack by insertion of additional delay is illustrated by the timing diagram in FIG. 1. FIG. 1 a) illustrates the signal being transmitted from a master unit at time $t_0$. The signal is a Direct-Sequence Spread-Spectrum (DSSS) signal comprising a repeated spreading code 10 which begins with binary chips '10011' and has a duration $t_p$. FIG. 1 b) illustrates the signal received back at the master unit at time $t_1$ having been received and re-transmitted by a tag. The genuine round-trip delay $t_1-t_0$ measured at the master unit comprises the genuine time-of-flight to the tag and back again, and the delay inherent in the tag. FIG. 1 c) illustrates the signal 20 which might be received at time $t_2$ when the system is under attack. The attacker has inserted an extra delay $\delta=t_2-t_1$ so that the total round-trip time exceeds one code period $t_p$. The master unit cannot tell the difference between the signal 20 received at time $t_2$ and a hypothetical signal 30 received at $t_2-t_p$ and measures the round-trip delay as $\Delta=t_2-t_p-t_0$, which is much shorter than the genuine round-trip delay. Consequently the tag appears to be much closer to the master unit than it actually is. The attacker may make the apparent distance take any desired value by appropriate selection of the additional delay $\delta$.

The attack by insertion of additional delay may be implemented by tampering with the tag, or may be implemented as a relay attack. In a relay attack, the attacker uses an intermediate device to relay signals from the tag to the master unit, and also from the master unit to the tag if required. By inserting, at the intermediate device, an appropriate delay into the signal, a distant tag may appear to be close to the master unit. Such a relay attack has been used by car thieves to deceive a car security system into unlocking the car doors when the owner with a passive keyfob is distant from his car.

The ambiguity problem could be avoided if a long code is used and not repeated during the signal transmission, but such long codes result in a relatively complex receiver.

An object of the invention is to improve the robustness of distance measurement against attack.

According to a first aspect of the invention there is provided a method of determining a distance between a first device and a second device, comprising, at the first device, transmitting a signal comprising simultaneous first and second components, wherein the first component comprises a repeated first code and the second component comprises a repeated second code and the first and second codes are of unequal duration, and at the second device: receiving the signal; detecting the first and second codes; determining from the detected first and second codes respective first and second indications of the distance; comparing the first and second indications of the distance; and generating a third indication of the distance in response to the first and second indications of the distance being equal within a predetermined tolerance.

According to a second aspect of the invention there is provided a system for determining distance comprising a first device having means for transmitting a signal comprising simultaneous first and second components, wherein the first component comprises a repeated first code and the second component comprises a repeated second code and the first and second codes are of unequal duration, and a second device having means for receiving the signal, means for detecting the first and second codes, means for determining from the detected first and second codes respective first and second indications of the distance, means for comparing the first and second indications of the distance, and means for generating a third indication of the distance in response to the first and second indications of the distance being equal within a predetermined tolerance.

According to a third aspect of the invention there is provided a device for determining distance, comprising means for receiving a signal comprising simultaneous first and second components, wherein the first component comprises a repeated first code and the second component comprises a repeated second code and the first and second codes are of unequal duration, means for detecting the first and second codes, means for determining from the detected first and second codes respective first and second indications of the propagation distance of the signal, means for comparing the first and second indications of the propagation distance, and means for generating a third indication of the propagation distance in response to the first and second indications of the propagation distance being equal within a predetermined tolerance.

According to a fourth aspect of the invention there is provided a device suitable for use in use in a system for measuring distance, comprising means for generating and transmitting a signal comprising simultaneous first and second components, wherein the first component comprises a repeated first code and the second component comprises a repeated second code and the first and second codes are of unequal duration.

By using a signal comprising simultaneous codes having different durations, it becomes more difficult for an attacker to detect the signal. Therefore the system is more robust against attack.

By using a signal comprising simultaneous codes having different durations, performing separate distance measurements using each code, and requiring each measurement to yield the same or a similar result, it becomes more difficult for an attacker to implement an additional delay which will deceive the system. Therefore robustness is further improved.

In general, when using a signal comprising simultaneous, repeated codes having different durations, the additional delay which should be introduced by an attacker to successfully deceive the system is a common multiple of the durations of the constituent codes. By selecting the code durations such that the least common multiple (LCM) duration corresponds to a time-of-flight, and hence distance, that can readily be discounted as false, the system can be even more robust against attack. For example, consecutive measurements made a short time interval apart but indicating widely differing distances may indicate an impossible speed of motion, and therefore indicate that the system has been subject to attack.

Preferably, the respective durations of the first and second codes are proportional to respective numbers having a relative prime relationship. Such a relationship results in a least common multiple (LCM) duration which is long, thereby improving robustness against attack.

Optionally, the signal transmitted by the first device may be a re-transmission of a signal received by the first device, having been transmitted initially by the second device.

Figure 5:
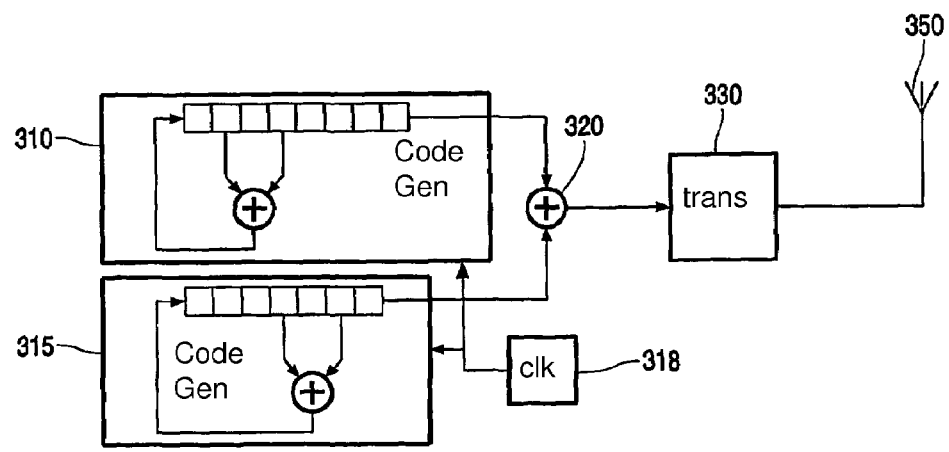
Figure 6:
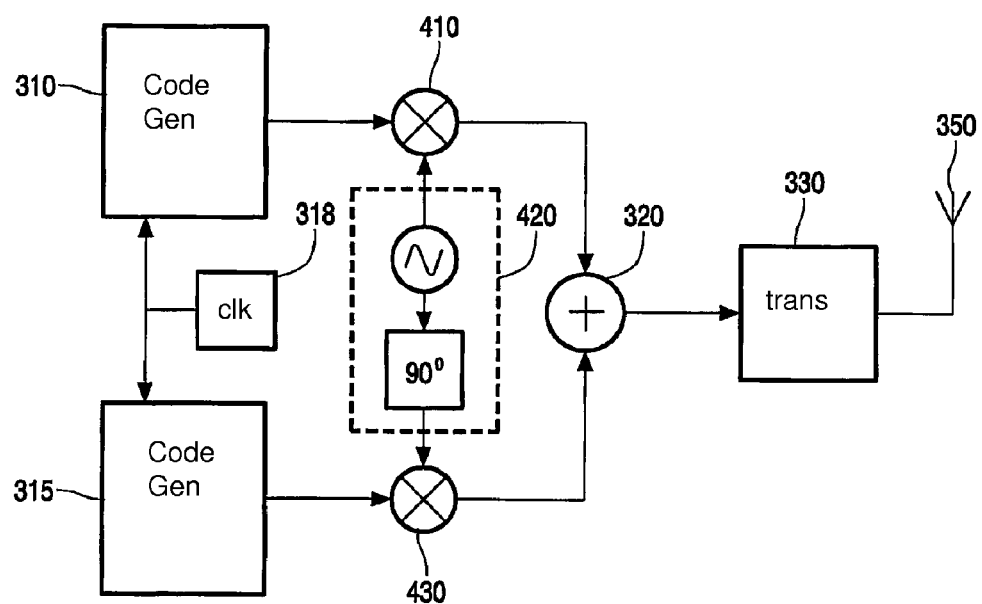

The invention will now be described, by way of example only, with reference to the accompanying drawings wherein:

FIG. 1 is a timing diagram illustrating attack by insertion of additional delay, FIG. 2 is a schematic block diagram of a system for measuring distance, FIG. 3 is a schematic block diagram of a device for determining distance, FIG. 4 is a schematic block diagram of a device for use in a system for measuring distance, FIG. 5 is a schematic block diagram of an alternative embodiment of a device for use in a system for measuring distance, and FIG. 6 is a schematic block diagram of a further alternative embodiment of a device for use in a system for measuring distance.

Referring to FIG. 2, there is shown a system for measuring distance comprising a first device 100 and a second device 200. The first device 100 could be, for example, a tag attached to a parcel, and the second device 200 could be a master unit for tracking parcels. As a further example, the first device 100 could be a keyfob and the second device 200 could be a vehicle security unit. In operation a signal is transmitted from the second device 200, is received by the first device 100 and is re-transmitted back to the second device 200 on a different frequency where it is received and processed to determine the distance between the first device 100 and the second device 200.

Referring to FIG. 3, there is shown a schematic block diagram of the second device 200. There is a first code generator 210 comprising a first linear feedback shift register for generating a first code and a second code generator 215 comprising a second linear feedback shift register for generating a second code. The first and second codes comprise a different number of chips, denoted respectively $N_1$ and $N_2$, but a common chip rate, which results in the first and second codes having different durations. Alternatively, the first and second codes can comprise a common number of chips but different chip rates, denoted respectively $C_1$ and $C_2$, which also results in the first and second codes having different durations.

In operation, the first code generator 210 generates a first signal component comprising the first code repeated identically, and the second code generator 215 generates simultaneously a second signal component comprising the second code repeated identically. The first and second code generators 210, 215 are coupled to a clock 218 for controlling the time of generation and the rate of generation of the first and second codes.

An output from each of the first and second code generators 210, 215 is coupled to respective inputs of a summing means 220 for summing the first and second signal components, and an output from the summing means 220 is coupled to an input of a transmitter 230 for transmitting a signal comprising a carrier modulated with the first and second signal components. An output of the transmitter 230 is coupled to an antenna 250 by means of a circulator 240.

The antenna 250 is coupled via the circulator 240 to an input of a receiver 260 for receiving the transmitted signal after it has been received and re-transmitted by the first device 100. An output of the receiver 260 is coupled to an input of a first code detector 270 for detecting the first code and to an input of a second code detector 275 for detecting the second code. The first and second code detectors 270, 275 are adapted to correlate the received signal with stored reference copies of respectively the first and second codes, and to measure the time-of-flight of each of the detected first and second codes. The first and second code detectors 270, 275 are coupled to the clock 218 which provides them with a timing reference to enable time-of-flight to be determined.

An output from each of the first and second code detectors 270, 275 is coupled to a comparison means 280 for comparing the respective time-of-flight measurements made by the first and second code detectors 270, 275. If the two time-of-flight measurements are equal within a predetermined tolerance, the comparison means 280 converts the time-of-flight into a distance value and delivers the distance value on a first output 281 to an application processor 290 for further processing dependent on the specific application. For example, if the application is a vehicle security system, the application processor 290 may be adapted to unlock a vehicle door if the distance value is below a predetermined threshold value, indicating that the owner with the keyfob is close to the vehicle. As another example, if the application is a parcel tracking system, the application processor 290 may initiate an alarm if the distance value is above a predetermined threshold value, indicating that a parcel carrying the first device 100 is being moved without authorisation.

If the two time-of-flight measurements are not equal within the predetermined tolerance, the comparison means 280 issues an indication to the application processor 290 on a second output 282 that the system for measuring distance is under attack. The manner in which this indication is processed by the application processor 290 is dependent on the specific application and the indication could be, for example, simply ignored.

Referring to FIG. 4, there is shown a schematic block diagram of the first device 100. There is a receiver 160 coupled to receive a signal from an antenna 150 via a circulator 140. An output of the receiver is coupled to an input of a transmitter 130, and the transmitter 130 is coupled to the antenna 150 via the circulator 140 to re-transmit the received signal on a different frequency.

In a preferred embodiment, the code lengths $N_1$ and $N_2$ have a relative prime relationship. Such a relationship may be implemented, for example, by using in the first code generator 210 a linear feed-back shift register having M stages arranged to generate a maximal length code having length $N_1=2^M-1$ chips, and using in the second code generator 215 a linear feed-back shift register having M+1 stages arranged to generate a maximal length code having length $N_2=2^{(M+1)}-1$ chips. Alternatively, the code chip rates $C_1$ and $C_2$ may have a relative prime relationship.

In an alternative embodiment, instead of the first device 100 retransmitting the signal received from the second device 200, the signal may be generated and transmitted by the first device 100. An embodiment of such a first device 100 is illustrated in FIG. 5 and comprises the following elements equivalent to the indicated elements described above in relation to the second device; first and second code generators 310, 315 (as 210, 215), clock 318 (as 218), summing means 320 (as 220), transmitter 330 (as 230), and antenna 350 (as 250). A corresponding embodiment of the second device 200 is as described above with reference to FIG. 3, but with the first and second code generators 210, 215, the summing means 220, and the transmitter 230 omitted. Alternative, known means of synchronising the clocks 218 are incorporated into the first and second devices 100, 200.

Optionally, a common modulation scheme need not be used for both the first and second components of the signal. For example, one of the components may be frequency or phase modulated onto a carrier forming a Direct Sequence Spread Spectrum (DSSS) signal and the other component a low-bandwidth amplitude modulated carrier which occupies nulls in the DSSS spectrum.

Optionally, the signal may be generated using a quadrature modulator. Referring to FIG. 6, a first mixer 410 multiplies the first component generated by the first code generator 310 by an in-phase local oscillator signal generated by a local oscillator 420 and a second mixer 430 multiplies the second component generated by the second code generator 320 by a quadrature-phase local oscillator signal. The resulting products are summed in the summing means 320.

Although the invention has been described in respect of a signal comprising simultaneous first and second components, the use of more than two simultaneous components is not excluded.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the art of distance measurement and the art of signalling and which may be used instead of or in addition to features already described herein.

The invention claimed is:

1. A method of determining a distance between a first device and a second device, comprising,
   at the first device,
      transmitting a signal comprising simultaneous first and second components, wherein the first component comprises a repeated first code and the second component comprises a repeated second code and the first and second codes are of unequal duration, wherein the first component is frequency or phase modulated onto a carrier forming a direct sequence spread spectrum (DSSS) signal and the second component is amplitude modulated and occupies nulls in the DSSS signal, and
   at the second device:
      receiving the signal;
      detecting the first and second codes; determining from the detected first and second codes respective first and second indications of the distance;
      comparing the first and second indications of the distance;
      generating a third indication of the distance in response to the first and second indications of the distance being equal within a predetermined tolerance, and
      initiating an alarm if the third indication of the distance is above a predetermined threshold value.

2. The method as claimed in claim 1, wherein the respective durations of the first and second codes are proportional to respective numbers having a relative prime relationship.

3. The method as claimed in claim 1, further comprising transmitting the signal from the second device and at the first device receiving the signal transmitted from the second device, wherein the transmitting at the first device comprises retransmitting the signal received from the second device.

4. The method as claimed in claim 1, wherein at least one of the first and second indications of distance is an indication of time of flight of the signal.

5. A system for determining distance comprising:
   a first device having
      means for transmitting a signal comprising simultaneous first and second components, wherein the first component comprises a repeated first code and the second component comprises a repeated second code and the first and second codes are of unequal duration, wherein the first component is frequency or phase modulated onto a carrier forming a direct sequence spread spectrum (DSSS) signal and the second component is amplitude modulated and occupies nulls in the DSSS signal, and
   a second device having
      means for receiving the signal,
      means for detecting the first and second codes, means ror determining from the detected first and second codes respective first and second indications of the distance,
      means for comparing the first and second indications of the distance, and means for generating a third indication of the distance in response to the first and second indications of the distance being equal within a predetermined tolerance.

6. The system as claimed in claim 5, wherein the respective durations of the first and second codes are proportional to respective numbers having a relative prime relationship.

7. The system as claimed in claim 5, the second device further comprising means for generating and transmitting the signal, and the first device further comprising means for receiving the signal transmitted by the second device and wherein the means for transmitting is coupled to retransmit the signal received from the second device.

8. The system as claimed in claim 5, wherein at least one of the first and second indications of distance is an indication of time of flight of the signal.

9. A device for determining distance, comprising:
means for receiving a signal comprising simultaneous first and second components, wherein the first component comprises a repeated first code and the second component comprises a repeated second code and the first and second codes are of unequal duration, wherein the first component is frequency or phase modulated onto a carrier forming a direct sequence spread spectrum (DSSS) signal and the second component is amplitude modulated and occupies nulls in the DSSS signal,
means for detecting the first and second codes,
means for determining from the detected first and second codes respective first and second indications of the propagation distance of the signal,
means for comparing the first and second indications of the propagation distance, and
means for generating a third indication of the propagation distance in response to the first and second indications of the propagation distance being equal within a predetermined tolerance.

10. The device as claimed in claim 9, comprising means for generating and transmitting the signal.

11. The device as claimed in claim 10, wherein the respective durations of the first and second codes are proportional to respective numbers having a relative prime relationship.

12. The method of claim 1, wherein the repeated first code is generated by a first linear feed-back shift register and has a first length of N1, and the second code is generated by a second linear feed-back shift register and has a second length of N2, and wherein $N1=2^M-1$ and $N2=2^{M+1}-1$, M being a number of stages of the first linear feed-back shift register and M+1 being a number of stages of the second linear feed-back shift register.

13. The system of claim 5, wherein the repeated first code is generated by a first linear feed-back shift register and has a first length of N1, and the second code is generated by a second linear feed-back shift register and has a second length of N2, and wherein $N1=2^M-1$ and $N2=2^{M+1}-1$, M being a number of stages of the first linear feed-back shift register and M+1 being a number of stages of the second linear feed-back shift register.

14. The device of claim 9, wherein the repeated first code is generated by a first linear feed-back shift register and has a first length of N1, and the second code is generated by a second linear feed-back shift register and has a second length of N2, and wherein $N1=2^M-1$ and $N2=2^{M+1}-1$, M being a number of stages of the first linear feed-back shift register and M+1 being a number of stages of the second linear feed-back shift register.

* * * * *